May 21, 1929.  L. L. WILLIAMS  1,714,478
MOLDING FOR AUTOMOBILE BODIES AND THE LIKE
Filed Feb. 2, 1926
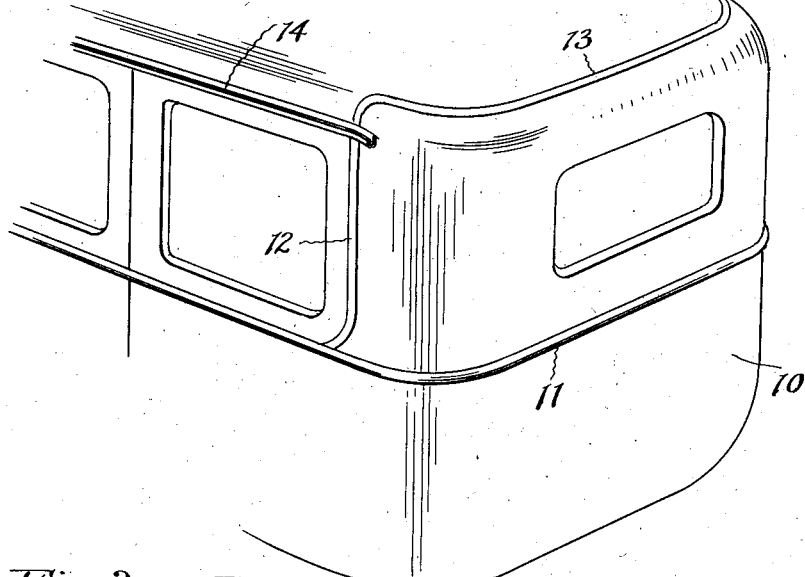
  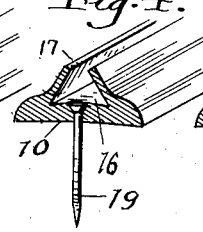 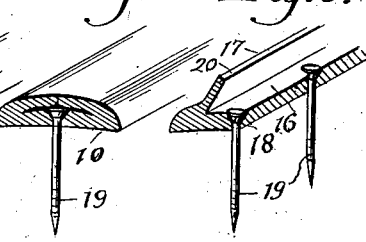
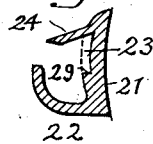 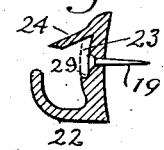 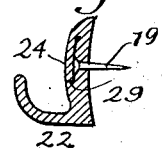
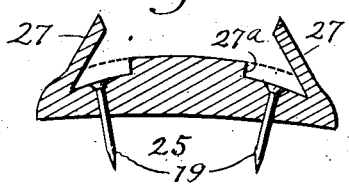 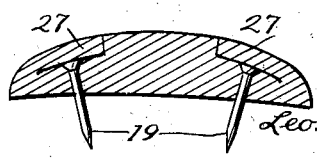
Inventor
Leo. L. Williams
by Kwis Hudson & Kent
ATTORNEYS Patented May 21, 1929.

1,714,478

UNITED STATES PATENT OFFICE.

LEO L. WILLIAMS, OF CLEVELAND HEIGHTS, OHIO.

MOLDING FOR AUTOMOBILE BODIES AND THE LIKE.

Application filed February 2, 1926. Serial No. 85,473.

This invention relates to moldings, such, for example, as employed on automobile bodies and elsewhere for the purpose of ornamenting and for covering joints in the construction of the body or device to which the molding is applied. More particularly the invention relates to moldings for automobile bodies which are generally formed of metal and are provided at various portions thereof with molding to cover joints in the adjacent sheets of metal and also as gutters along the sides of the top.

The principal object of the invention is to provide a molding having portions so formed that the nails or other retaining devices which are utilized in securing the molding in place can be readily and completely covered, at the same time providing an artistic and pleasing effect to the eye.

The molding formed in accordance with my invention is preferably formed of extruded malleable or pliable metal formed with a longitudinally extending groove through the base of which the retaining devices may be driven, and with one or more longitudinally extending lips so disposed that after the molding has been fastened in place the lip or lips, can be forced down into the groove so as to fill it, leaving a substantially smooth and unbroken outer surface and a tightly closed or sealed joint.

The invention may be further briefly summarized as consisting in certain novel details of construction, combinations or arrangements of parts, and steps of the improved method hereinafter described and set forth in the appended claims.

In the accompanying sheet of drawings wherein I have illustrated certain embodiments of the invention, Fig. 1 is a perspective view of a portion of an automobile body equipped with several molding strips; Figs. 2 to 5 are views partly in perspective and partly in section, showing one form that my improved molding may assume and illustrating different stages in the application of the strip to the body or part to which it is to be applied; Fig. 6 is a similar view with a strip in longitudinal section; Figs. 7, 8, and 9 are cross sections of a so-called drip molding for automobile bodies showing different stages of its application; and Figs. 10 and 11 are cross sections showing a modified and somewhat larger molding than illustrated in the preceding figures.

As before stated my invention finds its chief utility in connection with automobile bodies, though it is not confined to automobile use, and accordingly in Fig. 1 I have shown at 10 a portion of an automobile body to illustrate where moldings are applied to such bodies. The body illustrated is provided with a so-called belt molding 11, a so-called vertical quarter molding 12, a rear roof molding 13 and a drip molding 14. These moldings are applied primarily for the purpose of closing the joints in the sheets of metal or other material of which the body is formed and, additionally, the molding 14 finishes the top or roof and serves as a drip trough.

In carrying out my invention, my improved molding is preferably formed of malleable or pliable metal inasmuch as certain portions are to be swaged and virtually welded together for a purpose to be explained, and the molding is preferably formed of extruded metal. With the form of my invention illustrated in Figs. 2 to 6 the molding strip is provided on its outer face with a longitudinally extending groove 16 extending uninterruptedly the full length of the strip and, in this instance, centrally thereof. The opposite sides of the groove 16 of the strip are formed by longitudinally extending lips or flanges 17 which project outwardly from the base or body portion toward each other forming a continuous channel with a relatively narrow opening between the free edges of the lips or flanges.

Between the base of the groove 16 and the back side of the strip, the stock is sufficiently thin that openings 18 can be punched therethrough at intervals to receive the retaining devices, such as nails or screws which are inserted or driven through the openings 18 into the body 10 or other part or object designed to receive the molding strip, to secure the strip in place.

Then by a suitable tool, preferably an air hammer, which delivers fairly light but extremely rapid blows and which are applied to the lips 17 preferably at right angles to the surface to which the molding is applied, these lips are driven inwardly filling or closing the groove 16. The amount of metal or stock in the lips is so selected, with reference to the size of the groove to be filled, that when the lips are driven inward they will substantially fill the groove and by applying the pressure in the direction stated the shoulder 20 formed at what was formerly the free edge of the lip is solidly driven against another shoulder of the molding and in this instance against the corresponding shoulder of the companion lip 17. Furthermore, there is just sufficient stock in the lips that the two shoulders are driven together so as to completely and tightly close the joint and in effect they are welded together so that a seam at the outer surface is scarcely discernible, if at all. Obviously the tight closing of the joint by driving the parts together in solid abutting relationship leaves the joint sealed against the admission of moisture. Furthermore, this leaves the outer surface of the molding smooth or substantially so, there appearing at times a slight ridge where the shoulders abut on the center line of the molding and this can be easily and quickly removed by a file, plane or other tool and in this smoothing off operation all trace of a seam or joint is obliterated.

It is not essential to my invention that the groove be closed by two lips adapted to meet or abut against each other along the center line of the molding, for with moldings adapted for certain purposes a single lip is desirable. For example: in Figs. 7 to 9 where I show a drip molding having a body portion 21 and a gutter forming portion 22, the body portion, when the molding is first extruded, is provided with a groove 23 through the base of which the retaining devices are adapted to be driven as before, which groove is adapted to be closed by a single lip 24 in the manner illustrated in Fig. 9. In this instance, the shoulder formed at the free edge of the lip is adapted to solidly abut against a shoulder 25 in the manner illustrated in Fig. 9 so that when the lip is forced inward over the heads of the retaining devices the outer surface of the lip forms a continuous and substantially uninterrupted surface with the gutter forming portions beneath, and of course the joint where the parts solidly abut is tightly closed.

In Figs. 10 and 11 I have shown a molding 25 which is of larger size than the moldings illustrated in the preceding figures, the moldings illustrated in these two figures being designed particularly for bus work where fairly large moldings are required. In this instance, each molding is designed to be secured in place by two rows of nails or other retaining devices arranged somewhat near the longitudinal edges of the molding. Therefore, this molding is provided with two grooves 26 through the bases of which the retaining devices are driven as before and each groove is adapted to be closed in the manner already described by bending inward a lip 27, the free edge of the lip solidly abutting against a shoulder 27ª in the manner illustrated in Fig. 11 so that the heads of both rows of retaining devices are concealed and entirely enclosed, and a smooth unbroken surface is provided from one edge of the molding to the other particularly after a finishing file or other tool is run over the outer surface along the lines of the folded-in lips.

It will be understood, of course, that the openings formed through the bases of the grooves for the retaining devices are not in the molding when it is extruded but these openings will be provided generally by punching where desired after the molding is formed.

It will be seen from the above description that in closing a molding formed in accordance with my invention, in its different forms, the edge of the lip and the part which it engages, whether the latter is the edge of a companionate lip or a fixed shoulder of the molding, are in solid abutting relationship and the parts thus abutting are virtually swaged or welded together. By swaging or welding as used herein I do not mean to imply that the two parts are secured together in the usual sense of either word but that the abutting surfaces are brought together in a manner such that there is a slight displacement or slight flowing of surface irregularities and at least a superficial coalescence of the engaging surfaces with the result that the evidence of a seam is substantially obliterated and the parts thus joined become in effect at least, as if formed of one continuous unbroken part.

Having described my invention, I claim:

1. A one piece molding of malleable metal having a base portion through which retaining devices are adapted to be inserted and having two longitudinally extending shoulder portions at least one of which is at the free edge of a lip foldable inwardly over the retaining devices, the shoulder portions being so formed that in the closing operation they solidly abut with a swaging action substantially as described.

2. A one piece molding of malleable or pliable metal in the form of a channel formed by a base and two outstanding longitudinally disposed continuous flanges adapted to be folded inwardly after retaining devices are inserted through the base and of such width that in the closing operation their edges solidly abut so as to form by the substantial swaging action of the engaging surfaces an unbroken outer surface.

3. A molding for the purpose described formed from one piece of pliable extruded metal and comprising a base through which retaining devices are adapted to be inserted and two continuous longitudinally extending flanges projecting outwardly from the base in convergent relation and forming with the latter a continuous channel with a relatively narrow opening between the free edges of the flanges, the latter being foldable inwardly onto the base and having sufficient width that when so folded their free edges will solidly abut with a superficial coalescence.

4. In combination, a metal molding strip and a body to which it is applied, said molding strip having a base which is secured to the body by retaining devices passing therethrough into the body, and having also a longitudinally extending lip overlying the retaining devices with a shoulder at the edge thereof swaged into solid abutting relationship with another shoulder of the strip so as to form a substantially uninterrupted surface therewith and a tightly closed joint.

In testimony whereof, I hereunto affix my signature.

LEO L. WILLIAMS.